United States Patent
Orihara et al.

(10) Patent No.: US 11,244,048 B2
(45) Date of Patent: Feb. 8, 2022

(54) ATTACK PATTERN EXTRACTION DEVICE, ATTACK PATTERN EXTRACTION METHOD, AND ATTACK PATTERN EXTRACTION PROGRAM

(71) Applicant: NIPPON TELEGRAPH AND TELEPHONE CORPORATION, Tokyo (JP)

(72) Inventors: Shingo Orihara, Musashino (JP); Tohru Sato, Musashino (JP); Yohsuke Shimada, Musashino (JP); Yuta Iwaki, Musashino (JP); Yang Zhong, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 266 days.

(21) Appl. No.: 16/489,355

(22) PCT Filed: Feb. 19, 2018

(86) PCT No.: PCT/JP2018/005772
§ 371 (c)(1),
(2) Date: Aug. 28, 2019

(87) PCT Pub. No.: WO2018/159361
PCT Pub. Date: Sep. 7, 2018

(65) Prior Publication Data
US 2019/0384910 A1 Dec. 19, 2019

(30) Foreign Application Priority Data
Mar. 3, 2017 (JP) .............................. JP2017-041122

(51) Int. Cl.
*G06F 21/56* (2013.01)
*G06F 21/55* (2013.01)
*H04L 29/06* (2006.01)

(52) U.S. Cl.
CPC ............ *G06F 21/56* (2013.01); *G06F 21/552* (2013.01); *G06F 21/554* (2013.01); *H04L 63/1416* (2013.01); *H04L 63/1425* (2013.01)

(58) Field of Classification Search
None
See application file for complete search history.

(56) References Cited

U.S. PATENT DOCUMENTS 8,001,136 B1 * 8/2011 Papachristou .......... G06F 16/36
707/758
8,494,985 B1 7/2013 Keralapura et al.
(Continued)

FOREIGN PATENT DOCUMENTS

JP 2004-192279 7/2004
JP 2005-234661 A 9/2005
(Continued)

OTHER PUBLICATIONS

International Search Report and Written Opinion dated Mar. 27, 2018 for PCT/JP2018/005772 filed on Feb. 19, 2018, 9 pages including English Translation of the International Search Report.
(Continued)

*Primary Examiner* — Christopher C Harris
(74) *Attorney, Agent, or Firm* — Xsensus LLP

(57) ABSTRACT

An attack pattern extraction device includes an extraction unit and an attack pattern generation unit. The extraction unit extracts a common character string of parameters included in an access log of communication that is determined as an attack. The attack pattern generation unit generates an attack pattern on the basis of a character string
(Continued)

with a string length being equal to or longer than a predetermined length among extracted consecutive character strings.

7 Claims, 7 Drawing Sheets

(56) References Cited

U.S. PATENT DOCUMENTS

| | | | | |
|---|---|---|---|---|
| 9,858,413 | B1* | 1/2018 | Zuo | G06F 21/561 |
| 10,225,269 | B2* | 3/2019 | Yi | H04L 63/1416 |
| 2002/0123995 | A1* | 9/2002 | Shibuya | G06F 16/90348 |
| 2005/0281291 | A1 | 12/2005 | Stolfo et al. | |
| 2008/0028468 | A1* | 1/2008 | Yi | H04L 63/1416 |
| | | | | 726/23 |
| 2009/0235357 | A1 | 9/2009 | Ebringer et al. | |
| 2010/0071063 | A1* | 3/2010 | Wang | H04L 63/145 |
| | | | | 726/23 |
| 2014/0380471 | A1* | 12/2014 | Levow | G06F 21/6263 |
| | | | | 726/23 |
| 2016/0094577 | A1* | 3/2016 | Shih | H04L 63/1425 |
| | | | | 726/25 |
| 2016/0373293 | A1* | 12/2016 | Kushmerick | H04L 67/10 |
| 2017/0264626 | A1* | 9/2017 | Xu | H04L 63/145 |
| 2018/0075235 | A1* | 3/2018 | Tajima | G06F 21/554 |

FOREIGN PATENT DOCUMENTS

| | | |
|---|---|---|
| JP | 2007-515867 A | 6/2007 |
| JP | 2007-242002 A | 9/2007 |

OTHER PUBLICATIONS

Ochi et al., "A Study for WAF signature generation for exploit", Computer Security Symposium, Oct. 11-13, 2016, pp. 958-963.
Office Acton dated Mar. 17, 2020 in Japanese Patent Application No. 2019-502889, 8 pages.

* cited by examiner

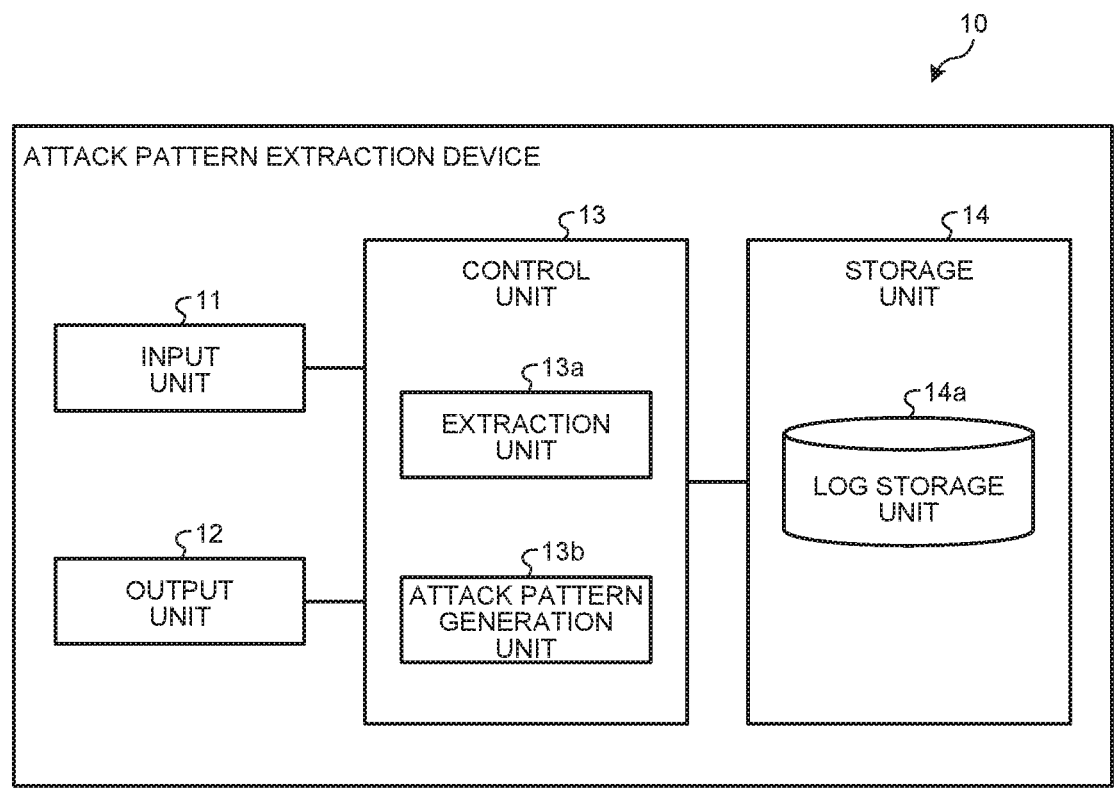

ATTACK PATTERN EXTRACTION DEVICE, ATTACK PATTERN EXTRACTION METHOD, AND ATTACK PATTERN EXTRACTION PROGRAM

CROSS-REFERENCE TO RELATED APPLICATIONS

The present application is based on PCT filing PCT/JP2018/005772, filed Feb. 19, 2018, which claims priority to JP 2017-041122, filed Mar. 3, 2017, the entire contents of each are incorporated herein by reference.

FIELD

The present invention relates to an attack pattern extraction device, an attack pattern extraction method, and an attack pattern extraction program.

BACKGROUND

In recent years, with the popularization of the Internet, attacks on Web servers are rapidly increasing. As countermeasures against the attacks, network intrusion detection/prevention systems using Intrusion Detection System (IDS), Intrusion Prevention System (IPS), Web Application Firewall (WAF), and the like have been known. These systems mainly store attack patterns as signatures and detect communication that matches the signatures. Therefore, it is necessary to generate a signature in accordance with an attack pattern in order to cope with a new attack.

Conventionally, in generation of an attack pattern, such as a signature, a technique of generating the attack pattern by performing morphological analysis on parameters based on a feature common to attack codes and calculating a Longest Common Subsequence (LCS) of an analysis result has been known.

CITATION LIST

Patent Literature

Non Patent Literature 1: Yuki Ochi, Tsuyoshi Abe, "A study for WAF signature generation for exploit", Computer Security Symposium 2016, pp. 958-963.

SUMMARY

Technical Problem

However, in the conventional technique as described above, there is a problem in that, in some cases, it is difficult to generate an appropriate attack pattern. Specifically, because the conventional technique is based on features of known attack codes, in some cases, it may be difficult to appropriately perform morphological analysis on an unknown attack and it may be impossible to generate an appropriate attack pattern. In addition, there is a problem in that a string length of a common subsequence is not taken into account in calculation of an LCS, so that an accidentally-matched short character string may be generated as a significant attack pattern.

Solution to Problem

An attack pattern extraction device includes: an extraction unit configured to extract a common character string among parameters included in an access log of communication that is determined as an attack; and an attack pattern generation unit configured to generate an attack pattern on the basis of a character string with a string length being equal to or larger than a predetermined string length among consecutive character strings that are extracted by the extraction unit.

An attack pattern extraction method implemented by an attack pattern extraction device, the method includes: an extraction step of extracting a common character string of parameters included in an access log of communication that is determined as an attack; and an attack pattern generation step of generating an attack pattern on the basis of a character string with a string length being equal to or longer than a predetermined string length among consecutive character strings that are extracted at the extraction step.

An attack pattern extraction program that causes a computer to execute: an extraction step of extracting a common character string of parameters included in an access log of communication that is determined as an attack; and an attack pattern generation step of generating an attack pattern on the basis of a character string with a string length being equal to or longer than a predetermined string length among consecutive character strings that are extracted at the extraction step.

Advantageous Effects of Invention

According to the present invention, it is possible to generate an appropriate attack pattern.

BRIEF DESCRIPTION OF DRAWINGS

FIG. 1 is a configuration diagram illustrating an overview of an attack pattern extraction device according to a first embodiment.

FIG. 2 is a diagram for explaining a table initialization process.

DESCRIPTION OF EMBODIMENTS

Figure 3:
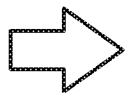
FIG. 3 is a diagram for explaining a table update process.

Embodiments of an attack pattern extraction device, an attack pattern extraction method, and an attack pattern extraction program according to the present application will be described in detail based on the drawings. The attack pattern extraction device, the attack pattern extraction method, and the attack pattern extraction program according to the present application are not limited by the embodiments below.

First Embodiment

In the following embodiment, a configuration of an attack pattern extraction device 10 according to a first embodiment and the flow of processes performed by the attack pattern extraction device 10 will be sequentially described, and effects of the first embodiment will be described at the end.

Configuration of Attack Pattern Extraction Device

First, the configuration of the attack pattern extraction device 10 will be described with reference to FIG. 1. FIG. 1 is a configuration diagram illustrating an overview of the attack pattern extraction device according to the first embodiment. As illustrated in FIG. 1, the attack pattern extraction device 10 includes an input unit 11, an output unit 12, a control unit 13, and a storage unit 14.

The input unit 11 is a device that receives input operation on various kinds of information, and receives, for example, a Web server's access log that is determined as an attack. The output unit 12 is a device that outputs various kinds of information, and outputs, for example, an attack pattern.

Further, the storage unit 14 stores therein data and programs that are needed for various processes performed by the control unit 13, and includes a log storage unit 14a as a unit that is closely related to the present invention. For example, the storage unit 14 may be a semiconductor memory device, such as a random access memory (RAM) or a flash memory, a storage device, such as a hard disk or an optical disk, or the like.

The log storage unit 14a stores therein a Web server's access log that is determined as an attack. The access log includes, for example, "source IP", "date and time", and "request" as data items. Alternatively, it may be possible to extract only parameters included in a request from the access log and adopt them as data items.

The control unit 13 includes an internal memory for storing a program that defines various processing procedures and storing necessary data, performs various processes using the program and the data, and includes an extraction unit 13a and an attack pattern generation unit 13b as units that are closely related to the present invention. Here, the control unit 13 may be an electronic circuit, such as a Central Processing Unit (CPU) or a Micro Processing Unit (MPU), or an integrated circuit, such as an Application Specific Integrated Circuit (ASIC) or a Field Programmable Gate Array (FPGA).

The extraction unit 13a extracts a common character string among parameters included in an access log of communication that is determined as an attack. The extraction unit 13a calculates a longest common subsequence that is a common character string among parameters and that includes a delimiter for separating non-consecutive character strings, and extracts a common character string by using the longest common subsequence.

The extraction unit 13a performs a clustering process as described below in order to extract the common character string among the parameters included in the access log of communication that is determined as an attack. The clustering process is described in detail below. In the following description, a length of a character string X will be denoted by "len(X)", and an i-th character (counted from 1) of the character string X will be denoted by "X[i]". Further, a plurality of parameters will be denoted by $p_1, p_2, \ldots, p_n$. Firstly, the extraction unit 13a performs clustering of the plurality of parameters $p_1, p_2, \ldots, p_n$.

First, the extraction unit 13a initializes a cluster set C. Clusters $C_i$ ($1 \leq i \leq n$) included in the cluster set C (C={$C_1$, $C_2, \ldots, C_n$}) is converted to associative arrays ($C_i$={lcs: $p_i$, strings: [$p_i$]} ($1 \leq i \leq n$)), each of which includes {lcs: parameter $p_i$ itself, strings: array including only $p_i$}. Further, the extraction unit 13a initializes a result list R by a blank array.

Subsequently, the extraction unit 13a performs a processing target cluster extraction process. Specifically, the extraction unit 13a extracts a single processing target cluster (for example, a last element) from the cluster set C and handles the extracted cluster as $C_t$. The cluster set C is updated with C\{$C_t$}. Here, "\" denotes a difference set. In other words, C is updated with the cluster set C from which the element $C_t$ is eliminated.

Then, the extraction unit 13a calculates LCSs of the processing target cluster and other clusters. Specifically, the extraction unit 13a sequentially calculates a longest common subsequence (LCS) of an lcs element of each of the elements $C_i$ ($1 \leq i \leq |C|$) in the cluster set C and an lcs element of $C_t$. The LCS is calculated through the procedure to be described later, and a result, in which non-consecutive sequences are separated by delimiters (for example: "|"), is obtained. As a specific description, the extraction unit 13a obtains "C|D|FG" as a result of calculation of the LCS of an lcs element of "abCDeFGh" of the element $C_i$ and an lcs element of "xyCzDFG" of $C_t$.

Then, after calculating the LCS of the processing target cluster and each of the clusters in the cluster set C, the extraction unit 13a adopts, as a score s($C_i$, $C_t$) of $C_i$ and $C_t$, a longest length among lengths of character substrings that are divided by the delimiters in the LCS.

In other words, the score s($C_i$, $C_t$) indicates the longest length among the lengths of the character substrings that are obtained by calculating the delimiter-inserted LCS of the lcs elements of the clusters $C_i$ and $C_t$ and dividing the LCS by the delimiters. For example, as for the cluster $C_i$ of "$C_i$={lcs: "AB|CD", strings: ["AB12CD", "ABCD"]}" and the cluster $C_t$ of "$C_t$={lcs: "AB|C|E", strings: ["ABxCE", "AByCdE"]}", "AB|C" is obtained as a delimiter-inserted LCS of "AB|CD" and "AB|C|E". Then, "AB|C" is divided by the delimiter, and the longest length of "2" between substring lengths of (2, 1) of "AB" and "C" is adopted as s($C_i$, $C_t$). The cluster $C_i$ ($1 \leq i \leq |C|$) for which the score s($C_i$, $C_t$) is maximum is adopted as $C_k$. If a plurality of clusters $C_i$ have the maximum score s($C_i$, $C_t$), an arbitrary one of $C_i$ having the maximum score s($C_i$, $C_t$) is adopted as $C_k$.

Subsequently, the extraction unit 13a performs a maximum score check process. Specifically, the extraction unit 13a checks whether the score s($C_k$, $C_t$) (maximum score) of $C_k$ and $C_t$ is equal to or larger than a minimum string length threshold. As a result of the check, if the score is smaller than the threshold, the extraction unit 13a adds the processing target cluster $C_t$ to the result list R, returns to the processing target cluster extraction process, extracts a new processing target cluster, and repeats the above-described process. In contrast, as a result of the check, if the score is equal to or larger than the threshold, the extraction unit 13a generates $C_N$ by merging $C_k$ and $C_t$ as described below. An lcs of $C_N$: a delimiter-inserted LCS of an lcs of $C_k$ and an lcs of $C_t$, and strings of $C_N$: strings of $C_k$ and strings of $C_t$ are connected as an array. Thereafter, the extraction unit 13a updates C with (C\{$C_k$})∪{$C_N$}, returns the processing target cluster extraction process, extracts a new processing cluster, and repeats the above-described process.

Then, the extraction unit 13a repeats the processing target cluster extraction process, an LCS calculation process, and the maximum score check process as described above until the size of the cluster set C reaches 1. Thereafter, if the size of the cluster set C reaches 1, the extraction unit 13a adds the last cluster to the result list R. Then, the extraction unit 13a notifies the attack pattern generation unit 13b of the result list R.

The LCS calculation process will be described in detail below. If two character strings x and y are given in the LCS calculation process, the extraction unit 13a calculates a longest common subsequence (LCS) of these character strings. In the calculation, the extraction unit 13a separates non-consecutive sequences by the delimiters (for example, "|"). Meanwhile, any symbols that are not included in x and y may be adopted as the delimiter. In the following, an example will be described in which x="aBCd" and y="BeC".

First, the extraction unit 13a receives, as input, the two character strings x and y that are LCS calculation targets. Then, the extraction unit 13a performs a table initialization process. For example, as illustrated in FIG. 2, the extraction unit 13a prepares an array t of (len(y)+1)×(len(x)+1), and initializes all of elements in the 0-th row and the 0-th column to 0. FIG. 2 is a diagram for explaining the table initialization process.

Then, the extraction unit 13a performs a table update process. Specifically, the extraction unit 13a assumes that i=1, 2, . . . , len(y) and j=1, 2, . . . , len(x), and updates the table in accordance with rules (1) and (2) below. (1) if x[j]=y[i], update is performed such that t[i][j]=t[i−1][j−1]+1, and (2) in cases other than x[j]=y[i], update is performed such that t[i][j]=max(t[i−1][j], t[i][j−1]).

The table update process will be described below with reference to an example in FIG. 3. FIG. 3 is a diagram for explaining the table update process. In the example illustrated in FIG. 3, for example, if a character "C" in the third column (x[3]) and a character "C" in the third row (y[3]) are identical, the extraction unit 13a updates an element t[3, 3] in the third row and the third column with a value "2" that is obtained by adding one to an element of "t[2, 2]=1" in the second row and the second column. Further, if a character "d" in the fourth column (x[4]) and a character "C" in the third row (y[3]) are different, the extraction unit 13a updates an element t[3, 4] in the third row and the fourth column with a maximum value of "2" between the element of "t[3, 3]=2" in the third row and the third column and the element of "t[2, 4]=1" in the second row and the fourth column.

Then, the extraction unit 13a initializes a resultant character string with a blank character string of " ". Subsequently, the extraction unit 13a repeats (1) and (2) below while i>0 and j>0, and updates the resultant character string. (1) If x[j]=y[i], x[j] is added to the resultant character string and each of i and j is subtracted by one. (2) In cases other than x[j]=y[i], if t[i−1][j]>t[i][j−1], i is subtracted by one, and in other cases, j is subtracted by one. If a last character of the resultant character string is not a delimiter, a delimiter is added, and, if the last character is a delimiter, no operation is performed.

Figure 4:
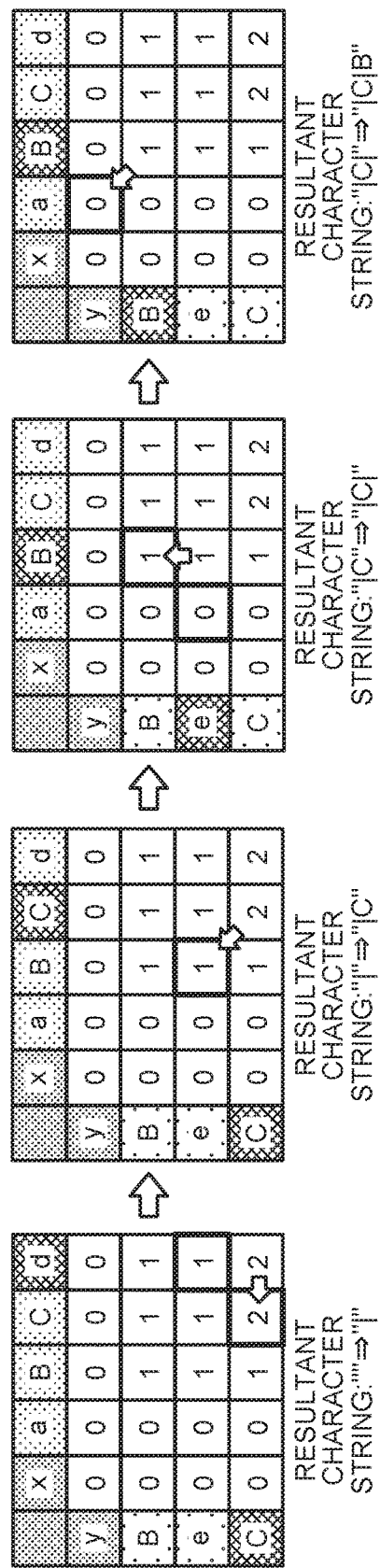
FIG. 4 is a diagram for explaining a resultant character string update process.

A resultant character string update process will be described with reference to an example in FIG. 4. FIG. 4 is a diagram for explaining the resultant character string update process. In the example illustrated in FIG. 4, for example, if the character "d" in the fourth column (x[4]) and the character "C" in the third row (y[3]) are different, the extraction unit 13a compares the element of "t[2, 4]=1" in the second row and the fourth column and the element of "t[3, 3]=2" in the third row and the third column, and, if the element of "t[3, 3]=2" in the third row and the third column is larger, j is subtracted by one. Meanwhile, because the last character of the resultant character string is not a delimiter, the resultant character string of " " is updated with "|".

Subsequently, if the character "C" in the third column (x[3]) and the character "C" in the third row (y[3]) are identical, the extraction unit 13a updates the resultant character string "|" with "|C", and each of i and j are subtracted by one. Then, if a character "B" in the second column (x[2]) and a character "e" of the second row (y[2]) are different, the extraction unit 13a compares an element of "t[1, 2]=1" in the first row and the second column and an element of "t[2, 1]=0" in the second row and the first column, and, if the element of "t[1, 2]=1" in the first row and the second column is larger, i is subtracted by 1. Further, because the last character of the resultant character string is not a delimiter, the resultant character string "|C" is updated with "|C|".

Then, if the character "B" in the second column (x[2]) and a character "B" in the first row (y[1]) are identical, the extraction unit 13a updates the resultant character string "|C|" with "|C|B", and subtracts each of i and j by 1.

Thereafter, the extraction unit 13a reverses the resultant character string. For example, if the resultant character string is "|C|B", the extraction unit 13a reverses the resultant character string and obtains "B|C|".

Referring back to FIG. 1, the attack pattern generation unit 13b generates an attack pattern on the basis of a character string with a string length being equal to or larger than a predetermined string length among consecutive character strings that are extracted by the extraction unit 13a. Further, if a plurality of character strings with string lengths being equal to or larger than the predetermined string length are extracted, the attack pattern generation unit 13b generates an attack pattern on the basis of the plurality of character strings and the order of appearance of the character strings. Furthermore, if a consecutive character string extracted by the extraction unit 13a is included in an attack pattern that is already generated, the attack pattern generation unit 13b does nothing.

Specifically, the attack pattern generation unit 13b extracts elements for each of which the number of strings elements is equal to or larger than a minimum cluster size threshold from among elements in the result list R=[$C'_1$, $C'_2$, . . . , $C'_m$]. An lcs element of the extracted elements is a common subsequence expected to be extracted. The attack pattern generation unit 13b divides the common subsequence by the delimiters, and regular expression in which character strings with lengths being equal to or larger than the minimum string length threshold are connected by "*" is adopted as an attack pattern that is to be ultimately obtained. Meanwhile, it may be possible to adopt, as the threshold, a new threshold that is different from the minimum string length threshold.

A concrete example will be described below. For example, the attack pattern generation unit 13b divides an lcs: "a|BCD|ef|g|HIJK" by the delimiters to obtain "a", "BCD", "ef", "g", and "HIJK", and connects character strings with lengths being equal to or larger than a threshold (for example, "3") by "*" in order of appearance, to thereby obtain "BCD*HIJK" as an attack pattern. Further, if "BCD*HIJK" is already generated as the attack pattern, no operation is performed.

In this manner, in the calculation of an LCS, the attack pattern extraction device 10 performs the calculation while inserting delimiters at portions where characters are not consecutive, and extracts character strings with lengths being equal to or larger than the threshold, so that an extremely short common subsequence is not to be extracted as the attack pattern.

Further, the attack pattern extraction device 10 calculates an LCS in which the delimiters are inserted when merging the clusters, so that it is possible to efficiently extract a common subsequence from three or more parameters without losing information indicating that "the common subsequence is consecutive".

Figure 5:
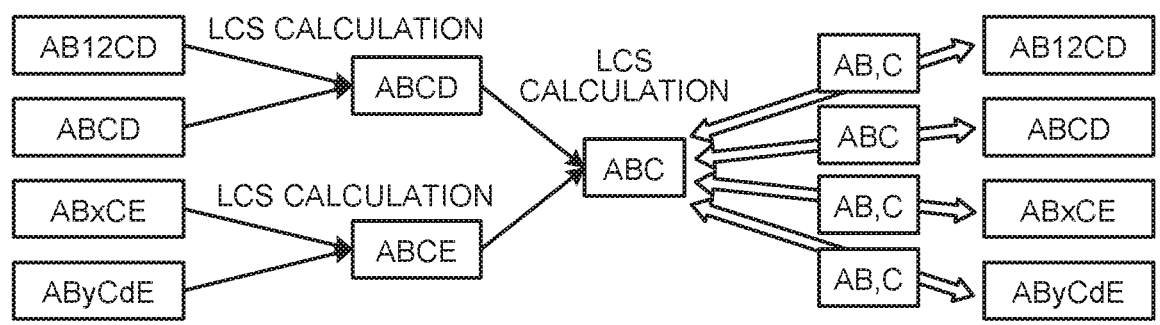
FIG. 5 is a diagram for explaining a case using a normal LCS.
Figure 6:
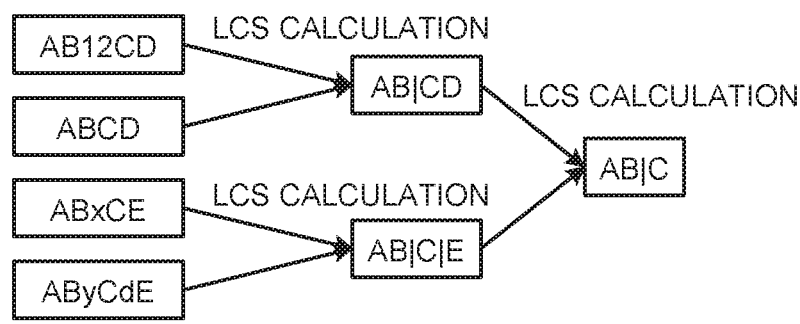
FIG. 6 is a diagram for explaining a case using a delimiter-inserted LCS.

Here, effects of use of the delimiter-inserted LCS compared with use of a normal LCS in which a delimiter is not inserted will be described with reference to examples in FIG. 5 and FIG. 6. FIG. 5 is a diagram for explaining a case in which a normal LCS is used. FIG. 6 is a diagram for explaining a case in which a delimiter-inserted LCS is used. FIG. 5 and FIG. 6 illustrate an example in which a consecutive longest common subsequence is extracted from AB12CD, ABCD, ABxCE, and ABYCdE.

As illustrated in FIG. 5, if a normal LCS with no delimiter string is used, it is impossible to obtain a consecutive longest common subsequence of "AB" unless an LCS of four character strings is calculated and the LCS is compared with each of the original character strings. In contrast, as illustrated in FIG. 6, if a delimiter-inserted LCS is used, it is possible to promptly recognize consecutive sequences in the original character strings when the LCS of the four character strings is calculated. Therefore, if the delimiter-inserted LCS is used, it is possible to efficiently extract a common subsequence.

Example of Processes performed by Attack Pattern Extraction Device

Figure 7:
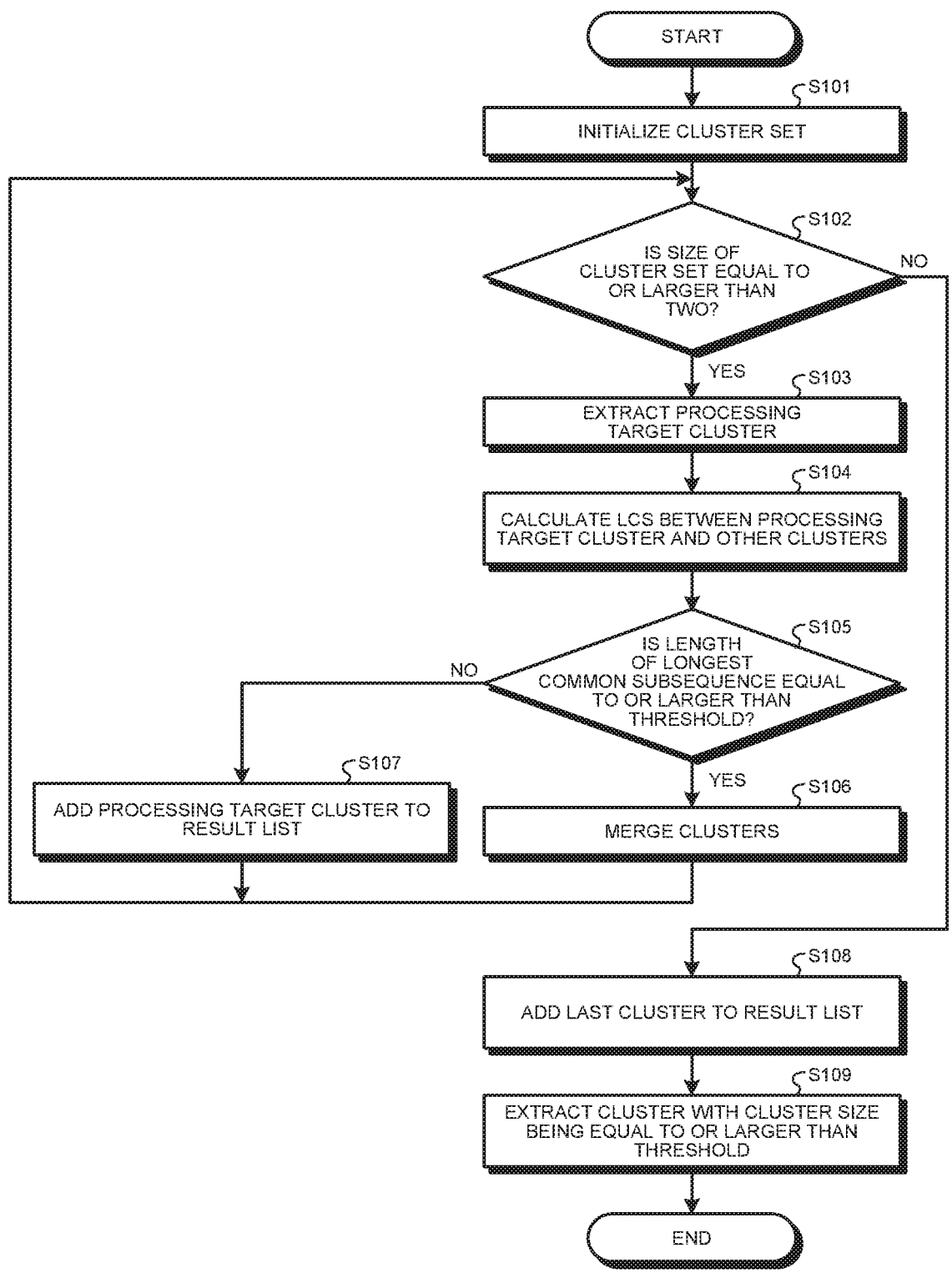
FIG. 7 is a flowchart illustrating the flow of a clustering process in the attack pattern extraction device according to the first embodiment.
Figure 8:
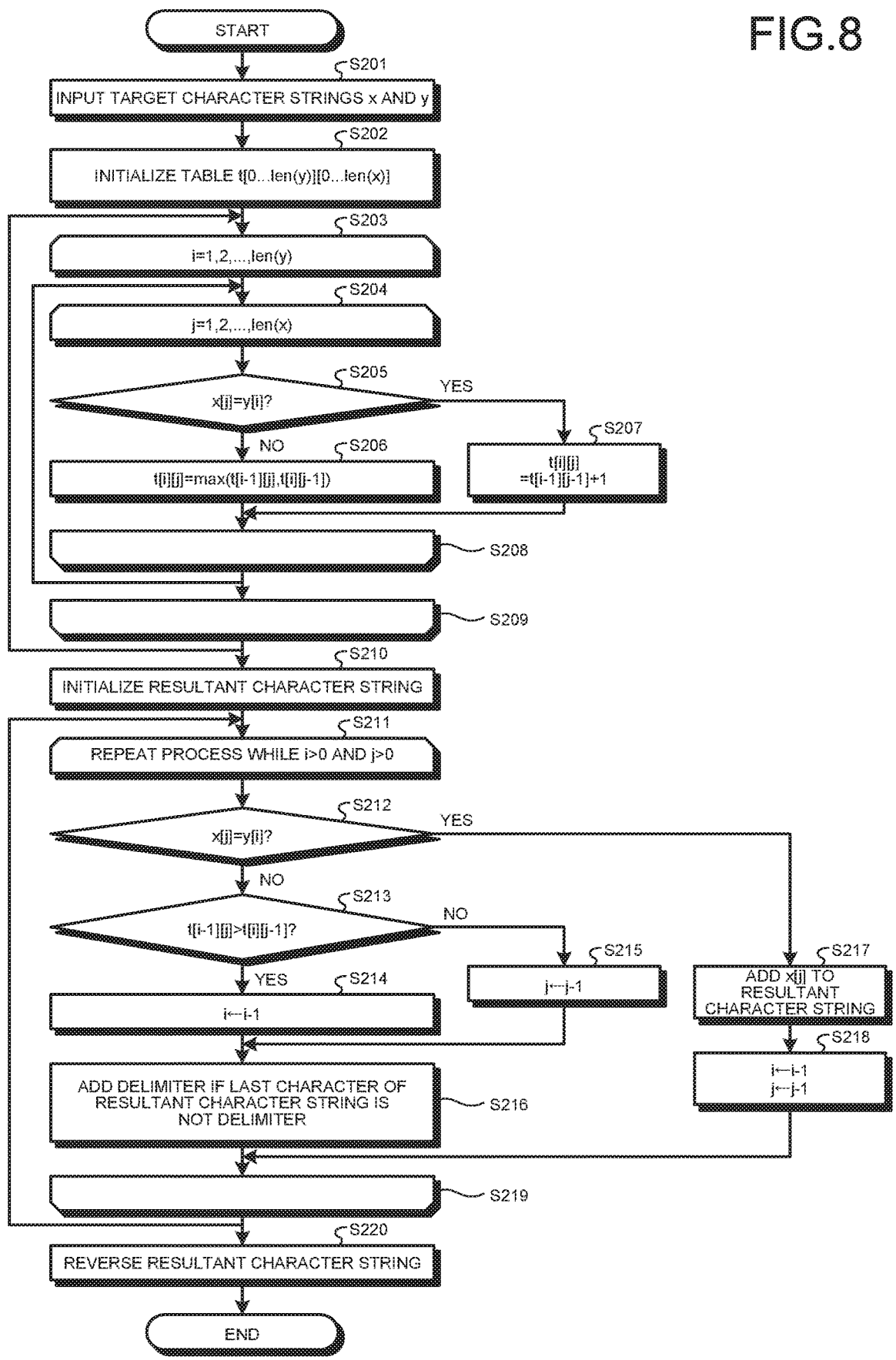
FIG. 8 is a flowchart illustrating the flow of an LCS calculation process in the attack pattern extraction device according to the first embodiment.

Next, the flow of processes performed by the attack pattern extraction device 10 will be described with reference to FIG. 7 and FIG. 8. FIG. 7 is a flowchart illustrating the flow of the clustering process performed by the attack pattern extraction device according to the first embodiment. FIG. 8 is a flowchart illustrating the flow of the LCS calculation process performed by the attack pattern extraction device according to the first embodiment.

First, the flow of the clustering process performed by the attack pattern extraction device 10 will be described with reference to FIG. 7. As illustrated in FIG. 7, the extraction unit 13a of the attack pattern extraction device 10 initializes the cluster set C (Step S101). Then, the extraction unit 13a determines whether the size of the cluster set C is equal to or larger than two (Step S102).

As a result, if the extraction unit 13a determines that the size of the cluster set is equal to or larger than two (Yes at Step S102), the extraction unit 13a performs the processing target cluster extraction process (Step S103). Specifically, the extraction unit 13a extracts a single processing target cluster (for example, a last element) from the cluster set C and handles the extracted cluster as $C_t$. The cluster set C is updated with $C\backslash\{C_t\}$. Here, "\" denotes a difference set. In other words, C is updated with the cluster set C from which the element $C_t$ is eliminated.

Then, the extraction unit 13a calculates LCSs of the processing target cluster and other clusters (Step S104). Specifically, the extraction unit 13a sequentially calculates a longest common subsequence (LCS) of an lcs element of each of the elements $C_i$ ($1 \leq i \leq |C|$) in the cluster set C and an lcs element of $C_t$. The element $C_i$ that has a common subsequence with a longest length in the LCS with respect to the element $C_t$ is adopted as $C_k$.

Then, the extraction unit 13a determines whether a longest common subsequence length is equal to or larger than a minimum string length threshold (Step S105). As a result, if the extraction unit 13a determines that the longest common subsequence length is equal to or larger than the minimum string length threshold (Yes at Step S105), the extraction unit 13a merges the clusters (Step S106), and returns to the process at Step S102. Specifically, the extraction unit 13a generates $C_N$ by merging $C_k$ and $C_t$ as described below. An lcs of $C_N$: a delimiter-inserted LCS of an lcs of $C_k$ and an lcs of $C_t$, and strings of $C_N$: strings of $C_k$ and strings of $C_t$ are connected as an array.

Further, if the extraction unit 13a determines that the longest common subsequence length is smaller than the minimum string length threshold (No at Step S105), the extraction unit 13a adds the processing target cluster $C_t$ to the result list R (Step S107), and returns to the process at Step S102.

Furthermore, at Step S102, if the extraction unit 13a determines that the size of the cluster set is one (No at Step S102), the extraction unit 13a adds the last cluster to the result list (Step S108). Then, the attack pattern generation unit 13b extracts a cluster with a cluster size being equal to or larger than the threshold (Step S109). Specifically, the attack pattern generation unit 13b extracts elements for each of which the number of strings elements is equal to or larger than the minimum cluster size threshold from among elements in the result list $R=[C'_1, C'_2, \ldots, C'_m]$. An lcs element of the extracted elements is a common subsequence expected to be extracted. The attack pattern generation unit 13b divides the common subsequence by the delimiters, regular expression in which character strings with lengths being equal to or larger than the minimum string length threshold are connected by "*" is adopted as an attack pattern that is to be ultimately obtained.

Next, the flow of the LCS calculation process performed by the attack pattern extraction device 10 will be described with reference to FIG. 8. As illustrated in FIG. 8, the extraction unit 13a receives, as input, two character strings x and y that are LCS calculation targets (Step S201). Then, the extraction unit 13a performs the table initialization process (Step S202). For example, the extraction unit 13a prepares the table (array) t of $(\text{len}(y)+1) \times (\text{len}(x)+1)$, and initializes all of elements in the 0-th row and the 0-th column to 0.

Then, the extraction unit 13a repeats a process of updating the table from Step S203 to Step S209 using $i=1, 2, \ldots, \text{len}(y)$ and $j=1, 2, \ldots, \text{len}(x)$. At Step S205, the extraction unit 13a determines whether $x[j]=y[i]$ (Step S205). If $x[j]=y[i]$ (Yes at Step S205), the extraction unit 13a performs update such that $t[i][j]=t[i-1][j-1]+1$ (Step S207). In cases other than $x[j]=y[i]$ (No at Step S205), the extraction unit 13a performs update such that $t[i][j]=\max(t[i-1][j], t[i][j-1])$ (Step S206).

Subsequently, the extraction unit 13a initializes a resultant character string with a blank character string of " " (Step S210). Then, the extraction unit 13a repeats processes from Step S211 to S219 while $i>0$ and $j>0$. At Step S212, the extraction unit 13a determines whether $x[j]=y[i]$ (Step S212). As a result, if $x[j]=y[i]$ (Yes at Step S212), the extraction unit 13a adds $x[j]$ to the resultant character string (Step S217), and subtracts one from each of i and j (Step S218).

Further, in cases other than $x[j]=y[i]$ (No at Step S212), the extraction unit 13a determines whether $t[i-1][j]>t[i][j-1]$ (Step S213). As a result, if $t[i-1][j]>t[i][j-1]$ (Yes at Step S213), the extraction unit 13a subtracts one from i (Step S214), and in cases other than $t[i-1][j]>t[i][j-1]$ (No at Step S213), the extraction unit 13a subtracts one from j (Step S215). Then, the extraction unit 13a adds a delimiter if a last character of the resultant character string is not a delimiter (Step S216).

Thereafter, the extraction unit 13a reverses the resultant character string (Step S220). For example, if the resultant character string is "|C|B", the extraction unit 13a reverses the resultant character string and obtains "B|C|".

Effects of First Embodiment

As described above, the attack pattern extraction device 10 according to the first embodiment extracts a common subsequence among parameters included in an access log of communication that is determined as an attack. Then, the attack pattern extraction device 10 generates an attack pattern on the basis of a character string with a string length being equal to or longer than a predetermined string length among extracted consecutive character strings. Therefore, the attack pattern extraction device 10 according to the first embodiment is able to generate an appropriate attack pattern.

Further, in calculation of an LCS, the attack pattern extraction device 10 performs the calculation while inserting delimiters at portions where characters are not consecutive, and extracts character strings with lengths being equal to or larger than the threshold, so that it is possible to generate an appropriate attack pattern while preventing an extremely short common subsequence from being extracted.

Furthermore, the attack pattern extraction device 10 calculates an LCS in which the delimiters are inserted when merging the clusters, so that it is possible to efficiently extract a common subsequence from three or more parameters without losing information indicating that "the common subsequence is consecutive".

Second Embodiment

In the first embodiment as described above, the example has been explained in which the clusters are merged when the score $s(C_k, C_t)$ (maximum score) of $C_k$ and $C_t$ is equal to or larger than the minimum string length threshold. However, if the length of the common subsequence is to be extremely reduced (if the score is largely reduced) by merging the clusters, it may be possible to inhibit the merge in order to prevent loss of a common subsequence that has a long string length and that needs to be maintained as an attack pattern.

To cope with this, in a second embodiment described below, a case will be explained in which merge is inhibited if the length of the common subsequence is to be extremely reduced (if the score is largely reduced) by merging the clusters. Explanation of the same components and processes as those of the first embodiment will be omitted.

If a length of a common character string is reduced to a predetermined rate or lower, the extraction unit 13a of an attack pattern extraction device of the second embodiment inhibits extraction of a common character string from the character string. Specifically, when the score $s(C_k, C_t)$ (maximum score) of $C_k$ and $C_t$ is equal to or larger than the minimum string length threshold in the maximum score check process, and if the number of strings elements of $C_t$ is equal to or larger than the minimum cluster size threshold before the merge and if a score reduction rate after the merge is equal to or higher than a score reduction rate threshold, the extraction unit 13a does not perform the merge, adds $C_t$ to the result list R, and returns to the processing target cluster extraction process. Here, the score reduction rate is calculated by comparing the score $s(C_k, C_t)$ and a longest string length L of a character string in which lcs elements of $C_t$ are separated by delimiters. For example, the score reduction rate is obtained such that $1-s(C_k, C_t)/L$.

Therefore, in the second embodiment, when an adequately long common subsequence is already obtained from an adequate amount of parameters, it is possible to prevent reduction of a length of a to-be-obtained common subsequence due to additional merge.

For example, in the first embodiment, when a cluster of {lcs: "PATTERN", strings: ["PATTERN1", "PATTERN2", "PATTERN3"]} is obtained, and if a cluster including a parameter of "TERN" is merged, a cluster of {lcs: "TERN", strings: ["PATTERN1", "PATTERN2", "PATTERN3", "TERN"]} is generated. Here, it is assumed that the minimum string length threshold is set to "4".

As for an attack pattern, it is preferable to extract the longest possible common subsequence; therefore, it is preferable to terminate the merge and fix the cluster without performing additional merge when a common subsequence of "PATTERN" is obtained. To cope with this, in the second embodiment, the score is largely reduced if "PATTERN" is replaced with "TERN", and therefore, it is possible to prevent the merge and obtain a desired common subsequence.

Effects of Second Embodiment

As described above, in the second embodiment, if a length of a common subsequence is to be extremely reduced by merging clusters, it is possible to inhibit the merge to prevent loss of a common subsequence that has a long string length and that needs to be maintained as an attack pattern.

System Configuration Etc.

The components of the devices illustrated in the drawings are conceptual function, and need not be physically configured in the manner illustrated in the drawings. In other words, specific forms of distribution and integration of the devices are not limited to those illustrated in the drawings, and all or part of the devices may be functionally or physically distributed or integrated in arbitrary units depending on various loads or use conditions. Further, all or an arbitrary part of the processing functions implemented by the devices may be realized by a CPU and a program analyzed and executed by the CPU, or may be realized by hardware using wired logic. For example, the extraction unit 13a and the attack pattern generation unit 13b may be integrated with each other.

Of the processes described in the embodiments, all or part of a process described as being performed automatically may also be performed manually. Alternatively, all or part of a process described as being performed manually may also be performed automatically by known methods. In addition, the processing procedures, control procedures, specific names, and information including various kinds of data and parameters illustrated in the above-described document and drawings may be arbitrarily changed unless otherwise specified.

Program

It may be possible to generate a program in which the processes performed by the attack pattern extraction device described in the above embodiments are written in a computer-executable language. For example, it may be possible to generate the attack pattern extraction program in which the processes performed by the attack pattern extraction device 10 according to the embodiment are written in a computer-executable language. In this case, it is possible to achieve the same effects as those of the above-described embodiments by causing the computer to execute the attack pattern extraction program. Further, it may be possible to record the attack pattern extraction program in a computer-readable recording medium, and cause the computer to read and execute the attack pattern extraction program recorded in the recording medium to thereby realize the same processes as those of the above-described embodiments.

Figure 9:
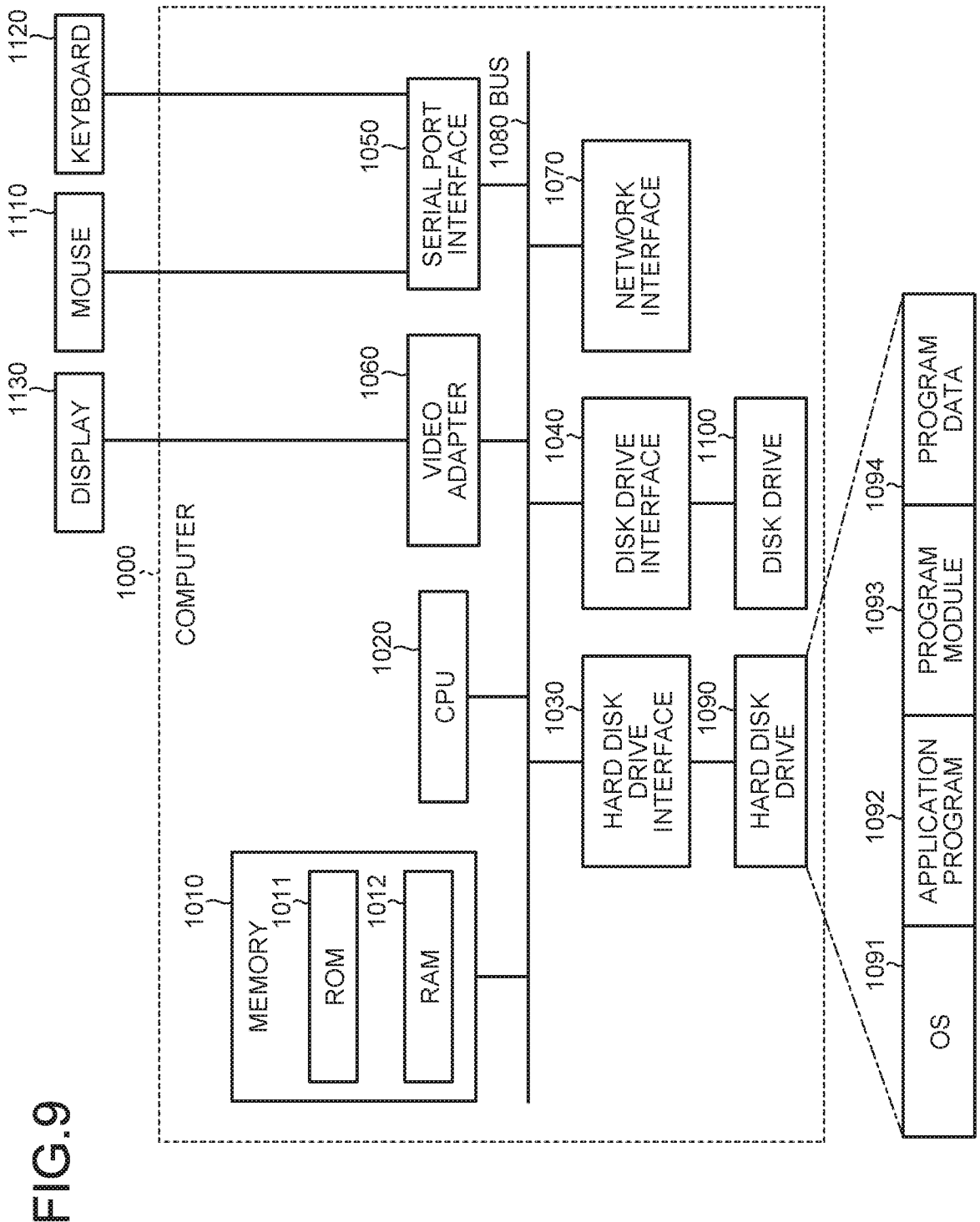
FIG. 9 is a diagram illustrating a computer that executes an attack pattern extraction program.

FIG. 9 is a diagram illustrating a computer 1000 that executes the attack pattern extraction program. As illustrated in FIG. 9, the computer 1000 includes, for example, a memory 1010, a CPU 1020, a hard disk drive interface 1030, a disk drive interface 1040, a serial port interface 1050, a video adapter 1060, and a network interface 1070, all of which are connected to one another via a bus 1080.

The memory 1010 includes, as illustrated in FIG. 9, a Read Only Memory (ROM) 1011 and a RAM 1012. The ROM 1011 stores therein, for example, a boot program, such as Basic Input Output System (BIOS). The hard disk drive interface 1030 is connected to a hard disk drive 1090 as illustrated in FIG. 9. The disk drive interface 1040 is connected to a disk drive 1100 as illustrated in FIG. 9. For example, a removable storage medium, such as a magnetic disk or an optical disk, is inserted in the disk drive 1100. The serial port interface 1050 is connected to, for example, a mouse 1110 and a keyboard 1120 as illustrated in FIG. 9. The video adapter 1060 is connected to, for example, a display 1130, as illustrated in FIG. 9.

Here, as illustrated in FIG. 9, the hard disk drive 1090 stores therein, for example, an OS 1091, an application program 1092, a program module 1093, and program data 1094. In other words, the above-described attack pattern extraction program is stored, as a program module in which commands to be executed by the computer 1000 are written, in the hard disk drive 1090, for example.

Further, various kinds of data described in the above embodiments are stored, as program data, in the memory 1010 or the hard disk drive 1090, for example. Then, the CPU 1020 loads the program module 1093 and the program data 1094 stored in the memory 1010 or the hard disk drive 1090 onto the RAM 1012 and executes various processing procedures, if needed.

Meanwhile, the program module 1093 and the program data 1094 related to the attack pattern extraction program need not always be stored in the hard disk drive 1090, but may be stored in, for example, a removable storage medium and read by the CPU 1020 via the disk drive or the like. Alternatively, the program module 1093 and the program data 1094 related to the attack pattern extraction program may be stored in other computers connected via a network (Local Area Network (LAN), Wide Area Network (WAN), or the like)), and may be read by the CPU 1020 via the network interface 1070.

REFERENCE SIGNS LIST

10 ATTACK PATTERN EXTRACTION DEVICE
11 INPUT UNIT
12 OUTPUT UNIT
13 CONTROL UNIT
13a EXTRACTION UNIT
13b ATTACK PATTERN GENERATION UNIT
14 STORAGE UNIT
14a LOG STORAGE UNIT

The invention claimed is:

1. An attack pattern extraction device comprising:
a memory; and
a processor coupled to the memory, the processor configured to execute a process comprising:
extracting consecutive character strings among parameters included in an access log of communication that is determined as an attack and extracting a common character string among the consecutive character strings;
determining whether the common character string has a string length equal to or larger than a predetermined string length;
in response to a determination that the common character string has the string length equal to or larger than the predetermined string length, generating an attack pattern on the basis of the common character string; and
implementing a countermeasure against the attack in accordance with the attack pattern.

2. The attack pattern extraction device according to claim 1, wherein if a plurality of character strings with string lengths being equal to or larger than the predetermined string length are extracted, the generating generates an attack pattern on the basis of the plurality of character strings and an order of appearance of the character strings.

3. The attack pattern extraction device according to claim 1, wherein the extracting calculates a longest common subsequence that is a common character string among parameters and that includes a delimiter for separating non-consecutive character strings, and extracts a common character string by using the longest common subsequence.

4. The attack pattern extraction device according to claim 1, wherein when a consecutive character string extracted by the extracting is included in an attack pattern that is already generated, the generating deletes the extracted consecutive character string from the attack pattern.

5. The attack pattern extraction device according to claim 1, wherein when a length of a common character string is reduced to a predetermined length or lower, the extracting inhibits extraction of a common character string from the character string.

6. An attack pattern extraction method implemented by an attack pattern extraction device, the method comprising:
extracting consecutive character strings of parameters included in an access log of communication that is determined as an attack and extracting a common character string among the consecutive character strings;
determining whether the common character string has a string length equal to or larger than a predetermined string length;
in response to a determination that the common character string has the string length equal to or larger than the predetermined string length, generating an attack pattern on the basis of the common character string; and
implementing a countermeasure against the attack in accordance with the attack pattern.

7. A non-transitory computer-readable recording medium having stored therein an attack pattern extraction program that causes a computer to execute a process comprising:
extracting consecutive character strings of parameters included in an access log of communication that is determined as an attack and extracting a common character string among the consecutive character strings;
determining whether the common character string has a string length equal to or larger than a predetermined string length;
in response to a determination that the common character string has the string length equal to or larger than the predetermined string length, generating an attack pattern on the basis of the common character string; and
implementing a countermeasure against the attack in accordance with the attack pattern.

* * * * *